United States Patent Office 3,230,050
Patented Jan. 18, 1966

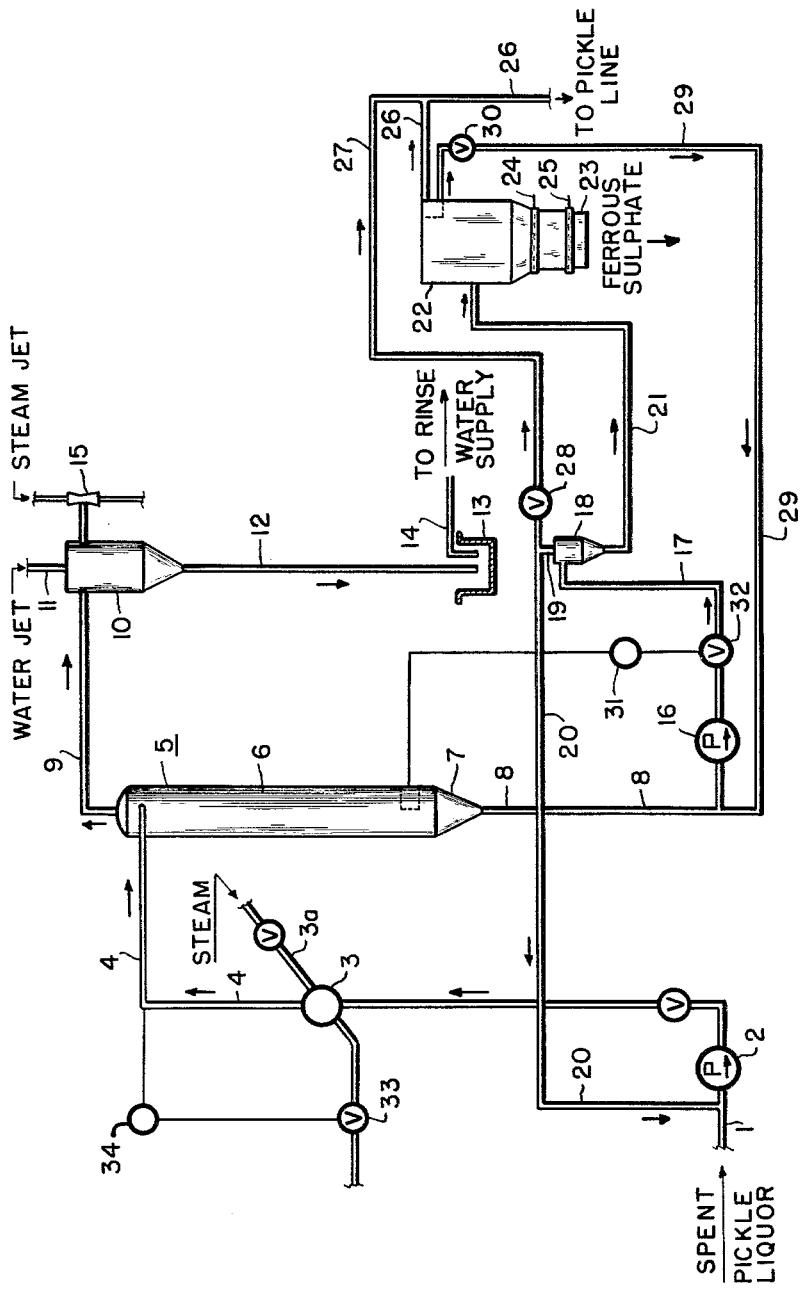

3,230,050
CRYSTALLIZATION APPARATUS INCLUDING A SWIRLING FILM EVAPORATOR AND A CYCLONE SEPARATOR
John A. Patterson, 103 Club View Drive, McMurray, Pa., and George F. Zargan, 40 Woodridge Drive, Carnegie, Pa.
Filed Dec. 8, 1960, Ser. No. 74,565
2 Claims. (Cl. 23—273)

This application relates to method and apparatus for concentration and crystallization of soluble salts; more particularly, it relates to method and apparatus for processing waste pickle liquor which is created in the steel industry when steel sheets are "pickled" in dilute sulphuric acid to remove iron oxide from the surface of the sheets. In this process, ferrous sulphate is formed with a corresponding reduction in sulphuric acid concentration with the result that, after use for a period of time, the pickling solution becomes too weak to be effective. The waste pickle liquor so formed is composed primarily of a dilute aqueous solution of ferrous sulphate and sulphuric acid.

To recover the waste pickle liquor for reuse in the pickling process or for other purposes, it has been proposed to evaporate the liquor to concentrate the ferrous sulphate and the sulphuric acid and then separate them by a settling tank or a centrifugal separator. The acid substantially free of ferrous sulphate is then returned to the make-up tank for the pickling line and the ferrous sulphate is removed as a solid. The evaporation of a solution of ferrous sulphate, however, presents problems due to the nature of the ferrous sulphate. The first problem is to form the crystals of ferrous sulphate during evaporation which are of such size so that they can be moved through the evaporating and settling apparatus and so that they will separate from the liquor. If the temperature and concentration conditions are not controlled carefully during evaporation, the ferrous sulphate will form a slurry of very fine particles which cannot be readily separated from the mother liquor. Another problem created by the evaporation of ferrous sulphate is that ferrous sulphate decreases in solubility as the temperature increases. It, therefore, has a tendency to precipitate out on the walls of whatever equipment is used to evaporate a solution containing ferrous sulphate.

To solve the problems created by the evaporation of ferrous sulphate, a number of solutions have been proposed. These, however, have involved elaborate equipment and complicated controls. See, for example, Mantius et al. U.S. Patent No. 2,078,088 and Sweet et al. U.S. Patent No. 2,960,391. We have invented method and apparatus for precipitating ferrous sulphate from spent pickle liquor which require relatively simple equipment and a minimum of control and supervision.

As we have stated, the problem is to precipitate ferrous sulphate from the mother liquor in crystals of such size that the sulphate can be handled and moved through the equipment and separated from the mother liquor. The size of the ferrous sulphate crystals is a function of the supersaturation of the solution containing the ferrous sulphate. That is, the degree of supersaturation should be so controlled that the rate of nucleation, i.e., the rate at which the initial small crystals form, will be matched by the rate at which the crystals grow. Nucleation and crystal growth are determined by temperature and the state of supersaturation of the solution. According to our invention, we recycle mother liquor from which the ferrous sulphate has been separated with the waste pickle liquor being treated prior to passing the waste pickle liquor into an evaporator and control the state of supersaturation by controlling the amount of liquor which is added to the waste pickle liquor. By varying the amount of mother liquor which is recycled, we are able to control the percentage of the total volume of liquor which is being passed to the evaporator which is evaporated and thereby control the state of supersaturation. We have also found that a particular type of evaporator will produce ferrous sulphate crystals of the correct size if the percentage of the total volume of liquor passed through the evaporator which is evaporated is controlled in accordance with our method.

In the accompanying drawing, there is set forth a flow sheet which illustrates the method and apparatus which we have invented. Referring to the drawing, waste pickle liquor is fed into the inlet 1 continuously where it is mixed with mother liquor from which ferrous sulphate has been removed, as hereinafter described. The mixture is pumped by a pump 2 to a heat exchanger 3 where the solution is heated by means of a steam supply 3A. From the heat exchanger, the liquor passes through a pipe 4 to an evaporator 5 which is of special design.

The evaporator 5 comprises a long narrow cylinder 6 closed at the bottom by a conical outlet 7 which leads to a pipe 8. The pipe 4 enters the cylinder 6 adjacent its top and at its side so that liquid is discharged from the pipe 4 into the cylinder tangentially to the inner surface of the cylinder. The liquor is delivered to the evaporator 5 at a sufficient rate that the liquor swirls around the inside of the cylinder 6 throughout the liquor's fall through the height of the cylinder thereby forming a swirling film of liquid on the inside wall of the cylinder 6. The film forms a large evaporating surface and the swirling effect creates a turbulence so that an increased amount of liquid is exposed for evaporation. The rapidly swirling liquid also minimizes the precipitation of crystals of ferrous sulphate in the liquid onto the inner surface of the cylinder.

The heat exchanger 3 heats the liquid to approximately 250° F. and the sensible heat of the liquid is used to carry on the evaporation in the evaporator 5. If necessary, however, additional heat can be supplied by a steam jacket around the cylinder 6 or, if the cylinder is made of glass, by direct radiation.

Liquid vaporized in the cylinder 6 rises to the top of the cylinder and is drawn off through a pipe 9 by a barometric condenser 10. A water jet 11 condenses vaporized liquid drawn off from the evaporator 5 and this condensate, in addition to the water from the jet, passes down the barometric leg 12 of the condenser to a "hot well" 13. The barometric leg extends below the top of the well 13 and an outlet pipe 14 extends into the well the same depth as the leg, thereby forming a liquid seal so that a vacuum can be maintained within the condenser 10. The condenser also has a steam jet 15 which creates a vacuum so as to draw out non-condensable material in the vapor passing from the evaporator 5 such, for example, as free hydrogen or dissolved air. Liquid withdrawn through the outlet 14 will have a sulphuric acid concentration of less than one half of one percent. This liquid, therefore, can be returned to the pickle line and used for rinsing the sheets after they are removed from the pickle bath.

Liquid passing through the evaporator 5 passes out through the conical outlet 7 into a pipe 8 and is conveyed by the pipe to a pump 16 which pumps the liquid through a pipe 17 into a liquid cyclone separator 18. The separator separates the liquid into a solids-free solution and a solids slurry of ferrous sulphate. The solids-free solution passes upwardly through the pipe 19 and into a pipe 20 which leads back to the inlet 1 where it is mixed with the incoming spent pickle liquor and passed with that liquor to the heat exchanger 3. The solids-slurry fraction separated out in the separator 18 passes through the pipe 21 which leads to a settling tank 22. In the tank 22, the solid ferrous sulphate settles out of the liquid and, at intervals, is withdrawn from the bottom of the tank through outlet 23 where it is loaded onto trucks or a conveyor belt for removal. Two gate valves 24 and 25 are used to withdraw ferrous sulphate from the bottom of the tank 22. After ferrous sulphate has accumulated on the gate 24 in an amount which is more than sufficient to fill the space between that gate and the gate 25, the gate 24 is opened and ferrous sulphate falls onto the gate 25. The gate 24 is then closed and the gate 25 is opened so as to release ferrous sulphate into the discharge outlet 23.

Mother liquor free of ferrous sulphate passes from the top of the tank 22 through a pipe 26 which can be connected to a pipe for taking the mother liquor back to the make-up tank of the pickle bath.

The system just described is continuous and, therefore, it must be balanced. That is to say, the mother liquor leaving the pipe 26 should be equalled by the volume of spent pickle liquor entering the inlet pipe 1 less the water evaporated in the evaporator 5. Also, there should be sufficient liquid in the system to supply the pumps 2 and 16 and prevent them from running dry. For this purpose, we provide extra circuits which will now be described.

For example, if extra liquid is required for recycling to the make-up tank in the pickle bath, it can be fed directly from the cyclone separator 18 through the pipe 27 by opening a valve 28 and thus bypassing the settling tank. If extra liquid is required for either of the pumps 2 or 16, it can be supplied from the top of the settling tank through a pipe 29 which is controlled by a valve 30. As shown in the drawing, the pipe 29 leads to the pipe 8 which, in turn, leads to the pump 16. From the pump 16, liquid can flow through the pipe 17, the separator 18, the pipes 19 and 20, back to the inlet 1.

We also provide a level control 31 which is actuated by the level of liquid in the cylinder 6 so that there will be sufficient liquid head in the cylinder 6 to supply the pump 16. As shown in the drawing, the level control 31 is connected to the cylinder 6 at a point adjacent its bottom and, if the level of the liquid in the cylinder 6 is beneath this point of connection, the control 31 closes a valve 32 in the line 17 and reduces the amount of liquid which the pump 16 withdraws from the cylinder 6.

We also control the temperature to which the spent pickle liquor and the recycled mother liquor are heated in the heat exchanger 3. A valve 33 controls the outlet of the steam supply 3A and thereby the amount of steam passing through the heat exchanger. A temperature controller 34 positioned in the line 4 between the heat exchanger and the top of the evaporator 5 controls the valve 33.

In the operation of our apparatus, the amount of mother liquor which is recycled to the spent pickle liquor is regulated so that the resulting mixture has up to approximately 2% supersaturation. The amount of spent pickle liquor which is created varies with each individual pickle line and the concentration of the sulphuric acid and of the ferrous sulphate in the spent pickle liquor also varies with each individual pickle line and, therefore, the exact amount of mother liquor which is recycled in each individual operation is best determined by trial and error. Experience has shown, however, that our apparatus operates within the following approximate ranges of temperature and flow rates.

Spent pickle liquor at a temperature ranging between 150 and 200° F. flows into the inlet 1 at the rate of approximately 1.5 gallons per minute. Mother liquor from the separator 18 flows through the pipe 20 to the pipe 1 at the rate of 20 to 25 gallons a minute and this mixture is pumped to the heat exchanger 3 which heats the mixture to a temperature ranging between 225° F. and 275° F. In the evaporator 5, approximately ¾ of a gallon per minute of liquid is vaporized and passed to the condenser 10 and from the condenser into the "hot well" and out through the outlet 14 to the supply of rinse water for the pickle tank.

The dimensions of the evaporator are selected so that the incoming liquid forms a swirling film against the interior of the cylinder 6 for substantially the length of the cylinder. The dimensions are, therefore, affected by the flow rate of the liquid. For the range of flow rates just mentioned for fluid flowing through a pipe having an internal diameter of approximately one inch, the interior diameter of the cylinder 6 is approximately 6 inches and the cylinder is 10 feet long. If there is an increased volume of liquid to be evaporated, additional evaporators can be connected in parallel to the one evaporator shown in the drawing.

Approximately 20 to 25 gallons per minute flow from the evaporator 5 to the pump 16 and from the pump to the separator 18. As stated, 20 to 25 gallons per minute flow from the separator 18 back to the pipe 1 and approximately ¾ of a gallon per minute of ferrous sulphate slurry passes from the separator through the pipe 21 to the settling tank 22. A suitable settling tank is 7 to 8 feet in diameter and 7 to 8 feet high in the cylindrical portion. Approximately ¾ of a gallon per minute of liquid having a sulphuric acid concentration of approximately 40% flows back to the make-up tank of the pickle line.

From the foregoing, it is apparent that we have invented a simple system for the removal of ferrous sulphate from spent pickle liquor and for the recovery of sulphuric acid in sufficient concentration that it can again be used in the pickling process. Moreover, the system requires a minimum of control. It may operate continuously with a minimum of supervision after it has been set in operation. The evaporator which we employ is simple in construction and requires substantially no maintenance since it is self-cleaning. Finally, the system may be readily adjusted and balanced to meet varying conditions of operation of the pickle line which supplies the spent pickle liquor.

While we have described certain presently preferred embodiments of our invention, it is to be understood that it may be otherwise variously embodied within the scope of the appended claims.

We claim:

1. Apparatus for the concentration of soluble salts from solutions containing them which comprises,
    (A) a swirling film evaporator having,
        (1) a hollow elongated cylinder,
        (2) an inlet positioned adjacent the top of the cylinder with its axis extending tangentially to the inner surface of the cylinder,
        (3) means for delivering solution to be concentrated to said inlet at a sufficient rate to cause the solution to swirl around the inside of the cylinder throughout the solution's fall through the cylinder,
        (4) a top closure for the cylinder providing a vapor outlet, and
        (5) means connected to the vapor outlet for withdrawing vaporized liquid from the evaporator, and
        (6) a bottom closure for the cylinder providing a bottom outlet from the cylinder,
    (B) a cyclone separator for liquids having
        (1) an inlet connected to the bottom outlet of the evaporator,
        (2) an outlet adjacent its bottom for discharging slurry,
        (3) an outlet adjacent its top connected to the means for delivering to the evaporator solution to be concentrated, and (C) a heater positioned in advance of and connected to said evaporator inlet for heating solution before it enters the evaporator.

2. Apparatus as defined in claim 1 and having a settling tank connected to the lower outlet of the separator to receive concentrated solution from the separator and separate liquids from solids in said solution by settling.

References Cited by the Examiner

UNITED STATES PATENTS

| | | | |
|---|---|---|---|
| 2,078,088 | 4/1937 | Mantius et al. | 23—126 X |
| 2,090,985 | 8/1937 | Peebles et al. | 159—13 |
| 2,310,650 | 2/1943 | Peebles | 159—13 |
| 2,562,495 | 7/1951 | Hulme | 159—13 |
| 2,570,213 | 10/1951 | Cross | 159—13 |
| 2,876,182 | 3/1959 | Hopper et al. | 23—273 X |
| 2,960,391 | 11/1960 | Sweet | 23—172 X |
| 3,071,447 | 1/1963 | Bernhardi | 23—273 |

FOREIGN PATENTS

| | | |
|---|---|---|
| 46,874 | 3/1910 | Austria. |
| 112,651 | 1939 | Sweden. |

NORMAN YUDKOFF, *Primary Examiner.*

S. EMERY, A. J. ADAMCIK, *Assistant Examiners.*